Dec. 18, 1962   E. BULLIS, JR   3,069,651
WIRING DEVICE

Filed July 2, 1959   2 Sheets-Sheet 1

Dec. 18, 1962  E. BULLIS, JR  3,069,651
WIRING DEVICE
Filed July 2, 1959  2 Sheets-Sheet 2
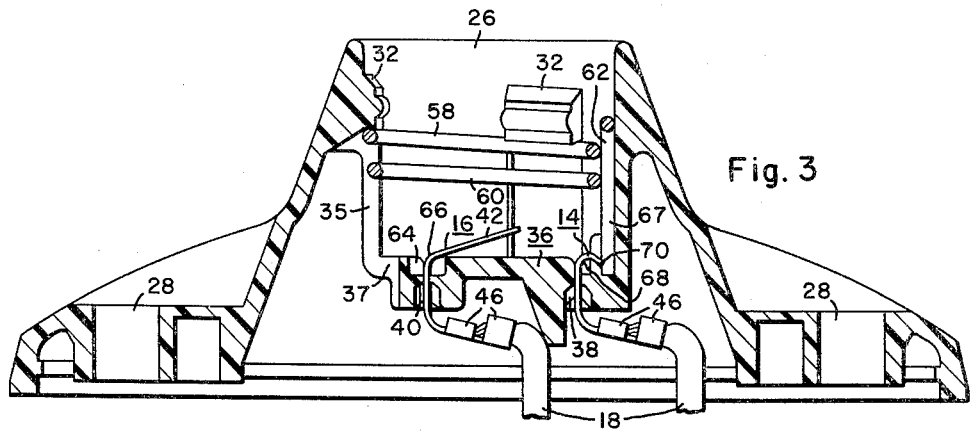
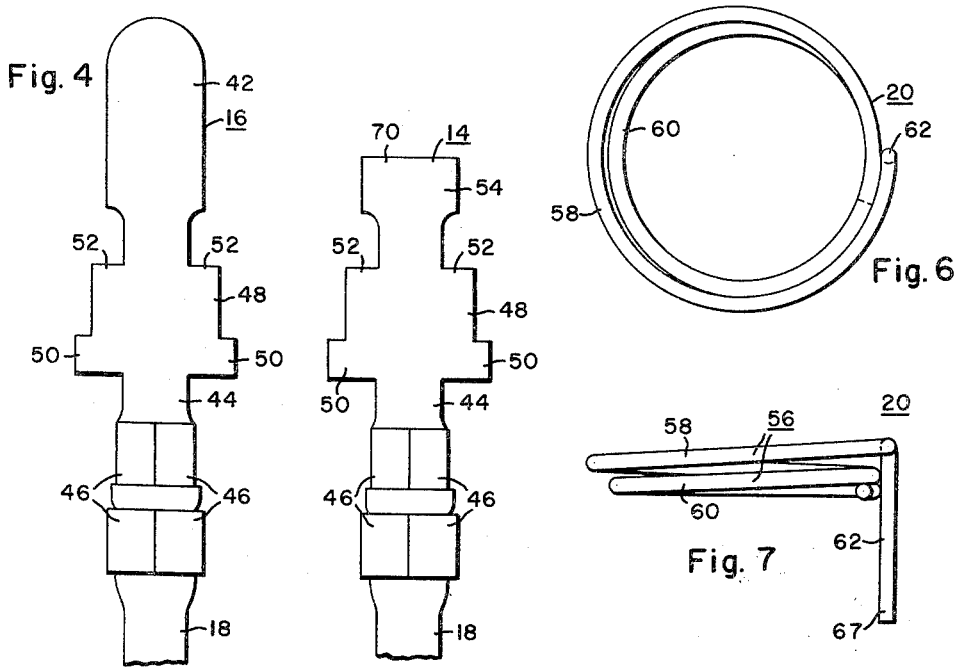
WITNESSES
John T. Healy, Jr.
Edward F. Possessky
INVENTOR
Earl Bullis, Jr.
BY Donald D. Smith
ATTORNEY

United States Patent Office 3,069,651
Patented Dec. 18, 1962

3,069,651
WIRING DEVICE
Earl Bullis, Jr., Fairfield, Conn., assignor to The Bryant Electric Company, Bridgeport, Conn., a corporation of Connecticut
Filed July 2, 1959, Ser. No. 824,616
5 Claims. (Cl. 339—67)

The present invention relates to electrical wiring devices, and more particularly to wiring devices that are adapted for electrically and mechanically engaging load apparatus, which, in certain instances, may be provided with a threaded, conductive base.

Generally considered, electrical load apparatus operates as intended when suitably energized, and means are ordinarily provided in such apparatus for enabling the same to be mechanically and electrically engaged with an energy transmitting wiring device. An example of this last observation is the case of household lamps and fuses, and the like, for which a threaded base is commonly provided. The threaded or shell section of the base functions as a peripheral contact, while a second or central portion of the base is adapted to function as a second contact insulated from the shell or peripheral contact, with the result being that electrical energy can be supplied to the device upon application of a potential difference across these contacts. When the threaded shell section of the base is tightened into a mating threaded portion of an energy transmitting wiring device, a firm mechanical support and an electrical connection for the supply of energy is provided for the load device.

Thus, the invention encompasses physical principles which relate to the structure and operation of energy transmitting wiring devices provided for the purposes recognized above. It is, of course, to be realized that economic principles, particularly under competitive circumstances, influence to a great extent those physical principles which are desirably employed in the construction of items of mass production. It follows that a view toward economic principles, particularly those related to cost reduction, is to be maintained in conceiving the construction of any given wiring device so as not only to optimize its character technically but also economically through minimized cost. A considerably effective cost reduction method, of course, is to simplify the assembly steps to be employed and to reduce the quantity of materials to be used in the construction of the wiring device.

The general considerations thus far made provide, at least in part, a proper perspective for a description of the present invention. It will subsequently become apparent that a unique combination of physical principles is employed to embody a wiring device of improved technical and economic character.

Thus, it is an object of the invention to provide a novel wiring device having improved means for engaging threaded load apparatus.

It is another object of the invention to provide a novel wiring device having improved structure effecting cost reduction through simplified assembly and the use of fewer materials and efficiently providing intended mechanical and electrical functions.

It is yet another object of the invention to provide a novel wiring device in which a coil spring shell is employed for engaging threaded load apparatus.

It is a further object of the invention to provide a novel lampholder for which the previously recited objects also apply.

These and other objects of the invention will become more apparent upon consideration of the following detailed description of an illustrative embodiment of the invention as related to the accompanying drawings, in which:

FIG. 3 is an elevational view of the lampholder shown in FIG. 1 taken along the reference line III—III thereof;

FIG. 4 is a top plan view of a terminal shown assembled with the lampholder in FIG. 1;

FIG. 5 is a top plan view of another terminal shown assembled with the lampholder in FIG. 1;

FIG. 6 is a top plan view of a spring shell of the lampholder shown in FIGS. 1, 2 and 3; and FIG. 7 is an elevational view of the spring shell shown in FIG. 6.

In accordance with the broad principles of the invention, a wiring device comprises a base which is readily assembled with terminals adapted for connection to power conductors and means effecting a thread engaging portion. Mutual physical forces between the mentioned elements of the wiring device maintain an assembly of the device without separate fasteners and operate to engage mechanically and electrically a threaded base of inserted load apparatus. It is intended that the illustrative embodiment be only exemplary of the present invention for modified embodiments will readily occur to those skilled in the art to which the invention relates.

Figure 1:
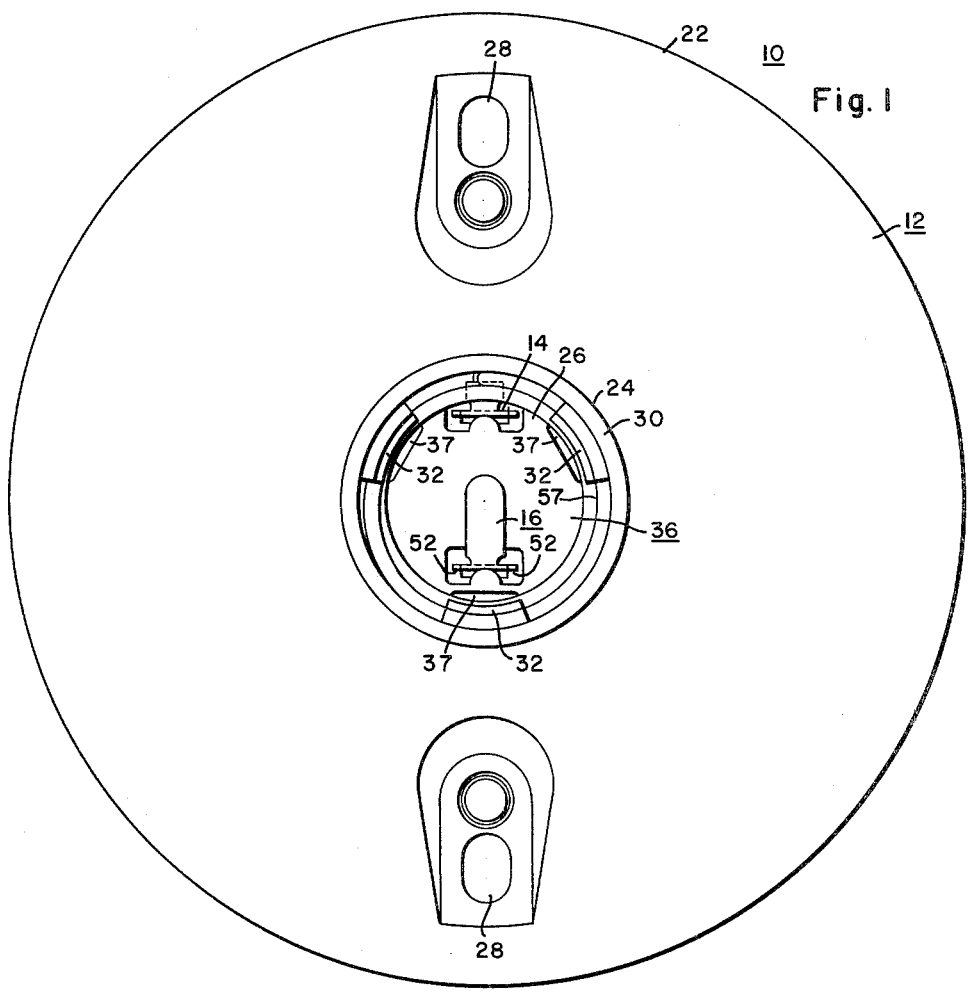
FIGURE 1 is a top plan view of a lampholder constructed in accordance with the principles of the invention.
Figure 2:
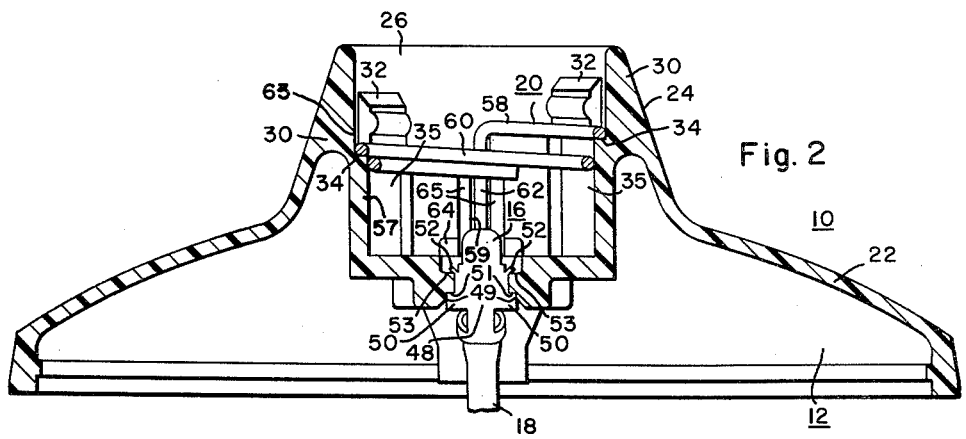
FIG. 2 is an elevational view of the lampholder shown in FIG. 1 taken along the reference line II—II thereof.

Accordingly, with a view toward the last consideration, the detailed description will now be set forth. With reference to FIGS. 1, 2, and 3, a lampholder 10 comprises a base 12 integrally molded from an insulative material, such as a white urea-based resin, for support of threaded load apparatus (not shown), such as an incandescent lamp; terminals 14, 16 for transmission of electrical energy from power conductors or wires 18 to the threaded base 12 of the load apparatus; and a spring shell 20 of a resilient conductive material functioning as means to engage threadedly the mentioned lamp. The construction of the base 12, the terminals 14, 16 and the spring shell 20 is accomplished through well-known manufacturing methods of molding, stamping, and forming, respectively.

Without considering these methods in detail, a more specific study of the base 12 is now in order. A pleasing appearance through symmetry is effected for the base 12, particularly in that the lampholder 10, here an illustrative embodiment of the invention, is designed for use in households and commercial establishments. The base 12 includes a generally circular footer 22 and a circular projecting portion or projection 24 in which an inner socket 26 is formed for the reception of the mentioned lamp. Openings 28 are provided in the footer 22 for passage of fasteners (not shown) for mounting the lampholder 10 on a suitable support (not shown).

The inner surface of a cylindrical wall 30 of the projection 24, which defines the socket 26, is provided with integral, inwardly projecting threaded sections 32 for guidance and engagement of the threaded base of the lamp. It is to be noted at this point in the description that the number and disposition of the threaded sections 32 are not to be considered limiting features of the invention.

Beneath the threaded sections 32 of the projection 24 is a ledge 34 extending helically about the inner surface of the wall 30 for approximately one revolution toward a floor 36 of the socket 26. The helical ledge 34 functions as a seat for the spring shell 20 in a manner which will subsequently be made more apparent. The floor 36, being transverse to and integral with the lower limit of the cylindrical wall 30, is provided with a slot 38 for reception of the terminal 14 and a second slot 40 for reception of the terminal 16. In order to mold the base 12 in a single operation, an opening 35 in the wall 30 is set under each of the threaded sections 32. Additionally, each opening 35 in the wall 30 is joined, respectively, with an opening 37 in the floor 36. Thus, the combined openings 35 and 37 allow for appropriate construction of a female die to form the threaded sections 32 during a single operation in molding. Further, it will be noted that, in the present embodiment, the openings 35 interrupt the helical ledge 34.

With reference to FIGS. 4 and 5, the terminals 14, 16 will now be described for an understanding of the relationships between the terminals 14, 16 and other structural elements in the operation of the lampholder 10. The terminal 16 of FIG. 4 is constructed for insertion through the slot 40 in the floor 36 of the base socket 26. A longitudinally extended tab 42 of the terminal 16 can be deformed to function as a central contact for the lampholder 10. At the end of the terminal 16 and opposite the tab 42, a longitudinal arm 44 with fingers 46 for crimping about an inserted wire is provided. Intermediate to the tab 42 and the arm 44, a portion 48 of the terminal 16 is adapted for alignment with the slot 40 and for engagement, after alignment, with the floor 36. More particularly, wings 50 of the intermediate portion 48 are provided for passage into grooves 49 of the slot 40 to abut an under portion 51 of the floor 36, and sections 52 are provided to be staked against an upper portion 53 of the floor 36 for a firm engagement of the terminal 16 with the base 12.

With reference to FIG. 5, the terminal 14 is generally similar to the terminal 16 of FIG. 4, with an exception that a shortened contact tab 54 is provided therefor. The terminal 14 is therefore alignable with the slot 38 for engagement with the base 12 with an added provision that the shortened contact tab 54 can be deformed for electrical and mechanical connection to the spring shell 20 and thereby function as a second or perimeter contact for the lampholder 10 in a manner to be described more fully hereinafter.

In the description thus far set forth, only general reference has been made to the spring shell 20 and a more specific description will now be necessary. Thus with reference to FIGS. 6 and 7, resilient and conductive wire is spirally formed into coils 56 to comprise the spring shell 20. An upper coil 58 of the shell 20 is formed with a varied radial dimension and a lower coil 60 is formed with a uniform and lesser radial dimension.

However, the radial dimension of a substantial sector or the upper coil 58 is uniform and is sufficient in value to provide for seating the upper coil 58 upon the helical ledge 34 of the projection 24. Further, the radius of the upper coil 58 is gradually diminished in value throughout an end sector of the coil 58 so that the coil 58 end has a radius equal in value to the lesser uniform radius of the coil 60 which is an integral continuation of the coil 58. There are several considerations to be noted at this point. In the first place, the variation in the radial dimensions of the coils 56 is not to be interpreted as a limiting feature of the invention. It is to be obvious that the coils 56 can be uniform in radius if seating of the spring shell 20 is provided for by means other than the helical ledge 34 of the projection 24, and, additionally, it is obvious that uniform or even discontinuous variations can be made in the radial dimension of the coils 56 without departing from the spirit of the invention. Secondly, by no means is it intended that the number of coils 56 described here be a limiting feature of the invention. Thus, while other arrangements are obvious, the spring shell 20 is provided here with the upper coil 58 for seating on the ledge 34 adjacent an upper portion 63 of the inner surface of the wall 30 and is provided with the lower coil 60, having a lesser diameter than the upper coil 58 to be limited in lateral expansion by a lower portion 57 of the inner surface of the wall 30, for engagement of threaded load apparatus inserted in the socket 26.

The free end of the upper coil 58 of the spring shell 20 is transversely deformed from the plane of the upper coil 58 so that an elongated arm 62 is extended downwardly for connection to the terminal 14. It will be later recognized that the coils 56 of the spring shell 20 operate to effect a strong electrical and mechanical engagement with the threaded base of the previously mentioned lamp.

To this point in the description, attention has been directed for the most part toward the structure of the lampholder 10, and it remains to consider the physical interrelationships of the structural elements in providing for the operation of the lampholder 10. To assemble the lampholder 10, the terminal 16 is passed through the base slot 40 so that the terminal wings 50 are guided into the grooves 49 to abut the under portions 51 of the socket floor 36, whereupon the contact tab 42 can be deformed to extend toward the central axis of the lampholder 10 as illustrated in FIG. 3. With the terminal wings 50 abutting the floor under portions 51, the terminal sections 52 can be staked against the floor upper portions 53, being located in recess 64 subjacent to the upper plane of the floor 36. A firm engagement of the terminal 16 with the base 12 is thereby accomplished in that motion between the terminal 16 and the base 12 is precluded by mutual forces arising from the engagement. Of course, the terminal contact tab 42 is free to move with cantilever spring action about a point indicated by the reference character 66 (FIG. 3) where the contact tab 42 is deformed from the plane of the terminal 16.

A further step in the assembly of the lampholder 10 is a positioning of the terminal 14 in the slot 38 of the floor of the socket 26 in a manner identical with that recited for the terminal 16. The spring shell 20 is then inserted into the socket 26 so that the upper coil 58 is seated between the helical ledge 34 and the under side of the threaded sections 32 of the projection 24. Additionally, final positioning of the spring shell 20 within the socket 36 requires that the arm 62 be positioned within a groove 59, along the bottom of a pocket 65 extended in the axial direction along the inner surface of the cylindrical wall 30 so that an end 67 of the arm 62 is stationed adjacent the terminal 14. When the screw shell 20 is properly positioned, the contact tab 54 of the terminal 14 can be deformed about a point indicated by the reference character 68 (FIG. 3) so that an end 70 of the tab 54 is forced, through at least a right angle but desirably through an angle measurably greater than a right angle, into frictional engagement with the arm end 67 of the spring shell 20.

The outer diameter of the top coil 58 of the spring shell 20 has a greater value than the inner diameter of the cylindrical wall 30 of the projection 24 at the portion 63 of the wall 30 between the helical ledge 34 and the threaded sections 32 so that the top coil 58 exerts spring forces on the portion 63 of the inner surface of the wall 30 to effect a clutching relationship between the spring shell 20 and the wall 30. The lower spring shell coil 60 has a smaller diameter than that of the coil 58, as previously indicated, and coils downwardly with a pitch somewhat less than that which is standard for the type of apparatus, such as the aforementioned lamp, to be inserted in the socket 26. Although, as noted, the pitch of coil 58 has a relatively lower value, for reasons to be subsequently described, it can have a value greater than or substantially equal to the value of the pitch of the threads of the apparatus to be inserted in the socket 26.

The assembly steps thus far related comprise a complete assembly of the lampholder 10 and are to be recognized as being so elementary that assembly costs of the lampholder 10 are virtually reduced to a minimum. It will also be recognized that material is sparingly employed with the use of the invention, such as in the spring shell 20. From a consideration of the operation of the lampholder 10 as a unit, however, it will become apparent that the related economy in construction does not result in impaired operation of the lampholder 10, rather that the economy in construction is a natural result of the application of the physical principles of the invention.

Each of the threaded sections 32 lies in successively spaced lateral planes of the lampholder 10 with a spacing substantially conforming, for example, to the pitch of the base shell of an incandescent lamp. Thus, when an incandescent lamp is inserted into the lampholder socket 26, the leading threads of the shell of the lamp base first engage the threaded sections 32 for guidance into the socket 26. Upon continued twisting of the lamp, the leading threads of the lamp base engage the coil 60, or multiple coils 56 if desired, of the firmly seated spring shell 20. Trailing threads on the lamp base, of course, follow the path of the leading threads of the lamp base.

It is to be noted that the lower coil 60 of the spring shell 20 has a diameter substantially equal to, or less than in certain instances, the threaded channel of the lamp base, and inasmuch as the coil 60 of the spring shell 20 provides a pitch somewhat less than that of the threads of the lamp base, a firm mechanical and electrical engagement is accomplished with the lamp when it is fully inserted in the lampholder 10. The lamp is then positioned within the socket 26 so that a central contact of the lamp base bears against the cantilever contact tab 42 of the terminal 16 which responds with reactionary force to effect a strong electrical connection between the lamp central contact and the terminal 16. Additionally, the leading threads of the lamp will have engaged the coil 60 of the spring shell 20 to provide conformity in pitch and, if applicable, in diameter, between the coil 60 and the lamp base threads. The effect of this conformity is to establish an electrical connection between the spring shell 20 and the lamp base as a result of spring forces of the spring shell 20. Further, the lagging threads of the lamp are in engagement with the threaded lampholder sections 32 as a result of operating forces including outward thrust forces imposed by the deflected spring shell coil 60. Of course, withdrawal forces, other than rotary, will not effect a withdrawal of the lamp from the lampholder 10.

Since a reliable electrical connection is established between the spring shell 20 of the lampholder 10 and the shell of the base of the inserted lamp, it is obvious that an electrical connection is then provided for the lamp base shell with the terminal 14 through the spring shell arm 62.

When the lampholder 10 is mounted for use, the terminals 14, 16 can be connected to the power wires 18, respectively, in a manner previously described so that a path is provided for the transmission of electrical energy to the inserted lamp. It is particularly evident that modified terminals can be substituted for those set forth in this description. For example, with suitable modifications, consistent with the principles disclosed here, a terminal device described in a copending application of S. A. Mason, entitled Quick Wiring Device, filed July 10, 1959, Serial No. 826,172, now Patent No. 2,997,686, and assigned to the present assignee, can provide automatic wiring engaging means for the lampholder 10. Additionally, screw-type terminals can be employed. In any case, it is particularly noteworthy that mutually acting forces, among the structural elements illustrated and described here, as embodying the invention, maintain a durable assembly of the illustrated lampholder 10.

In addition to the modifications of the illustrated lampholder, that have been indicated in the foregoing description, there are numerous adaptations which can be made without departing from the broad principles of the invention. In fact, most generally, the principles of the invention are applicable to varied types of wiring devices and, accordingly, it is desired, as previously indicated, that the present invention be not limited by the illustrative embodiment but rather that it be accorded an interpretation consistent with the scope and spirit of its broad principles.

What is claimed is:

1. A wiring device adapted to engage threaded load apparatus, said device comprising a base of insulative material having a generally cylindrical cavity extending inwardly from an open side thereof for reception of said apparatus and having integral means projecting radially into said cavity inwardly of said open base side, said projecting means having thread means adjacent its radially inmost extent for mating engagement with the threads of said apparatus, conductive coil spring means being disposed in said cavity and having at least a substantial portion of an end coil thereof so sized radially as to be engaged resiliently against the wall surface of said cavity located adjacently of said projecting means and further inwardly of said base open side than said base projecting means are located, said base wall surface and said substantial coil portion being located radially outwardly of the threading path of said load apparatus threads, means for supporting said substantial portion of said end coil against movement, said supporting means including an inwardly facing surface of said projecting means for supporting said substantial coil portion against movement toward said open base side and including wall means extending into said cavity from said wall surface so as to form a ledge facing said base open side for supporting said substantial coil portion against inward movement, said coil spring means also including at least a substantial portion of another coil of less diameter than said first coil portion and extending continuously from the first-mentioned coil and helically inwardly of said base open side and of said ledge so as to be in said threading path and thereby form conductive thread means in mechanical continuation of said base thread means, and means for energizing said apparatus serially through said coil spring means.

2. A wiring device as set forth in claim 1, wherein said projecting means include a plurality of base projections spaced circumferentially about said base cavity and overlying respective openings to the base side opposite said open base side and wherein said wall means include an equal plurality of wall portions spaced circumferentially about said base cavity, said wall portions being located circumferentially in line with the circumferential spaces between said base projections, respectively, whereby said insulative base can be molded in a single operation without side wedges and said coil spring means can readily be assembled with said base through said base open side.

3. A wiring device as set forth in claim 1, wherein said substantial portion of said another coil is resiliently engaged against a radially inward facing surface of said wall means.

4. A wiring device as set forth in claim 1, wherein an arm extends integrally from the end of said substantial portion of said end coil and is seated in a base slot extending inwardly of said base open side for the purpose of holding said coil spring means against unitary rotative movement and for the purpose of providing an electrical path to said apparatus from terminal means supported on said base.

5. A wiring device adapted to engage threaded load apparatus, said device comprising a base of insulative material having a generally cylindrical cavity extending inwardly from an open side thereof for reception of said apparatus and having integral means projecting radially into said cavity inwardly of said open base side, said projecting means having thread means adjacent its radially inmost extent for mating engagement with the threads of said apparatus, conductive coil spring means being disposed in said cavity and having at least a substantial portion of an end coil thereof so sized radially as to be engaged resiliently against the wall surface of said cavity located adjacently of said projecting means and further inwardly of said base open side than said base projecting means are located, said base wall surface and said substantial coil portion being located radially outwardly of the threading path of said load apparatus threads, means for supporting said substantial portion of said end coil against movement, said coil spring means also including at least a substantial portion of another coil of less diameter than said first coil portion and extending continuously from the first-mentioned coil and helically inwardly of said base open side and of said substantial portion of said end coil so as to be in said threading path and thereby form conductive thread means in mechanical continuation of said base thread means, and means for energizing said apparatus serially through said coil spring means.

References Cited in the file of this patent

UNITED STATES PATENTS

| | | |
|---|---|---|
| 612,152 | Bell | Oct. 11, 1898 |
| 941,276 | Russell | Nov. 23, 1909 |
| 1,094,907 | Kielland | Apr. 28, 1914 |
| 1,118,623 | Benjamin | Nov. 24, 1914 |
| 1,226,558 | Martinez | May 15, 1917 |
| 1,611,551 | Naumburg | Dec. 21, 1926 |
| 2,071,769 | Schlicker et al. | Feb. 23, 1937 |
| 2,718,626 | Benander | Sept. 20, 1955 |
| 2,782,392 | Stolle | Feb. 19, 1957 |
| 2,864,070 | Abramson | Dec. 9, 1958 |

FOREIGN PATENTS

| | | |
|---|---|---|
| 23,601 | Holland | Feb. 16, 1931 |
| 125,533 | Great Britain | Apr. 24, 1916 |
| 589,357 | Great Britain | June 18, 1947 |